INVENTOR
ROY F. HIGGINBOTHAM

BY Arnold, Roylance, Kruger & Durkee
ATTORNEYS

INVENTOR
ROY F. HIGGINBOTHAM
BY Arnold, Roylance, Kruger & Durkee ATTORNEYS

| MODULE ADDRESS 16 | 15 | 14 | 13 | FUNCTION ADDRESS 12 | 11 | 10 | 9 | INSTRUCTION 8 | 7 | 6 | 5 | 4 | 3 | 2 | 1 | FUNCTION TO BE CONTROLLED |
|---|---|---|---|---|---|---|---|---|---|---|---|---|---|---|---|---|
| 0 | 0 | 1 | 0 | 0 | 0 | 0 | 1 | 1 | 0 | 0 | 1 | 1 | 1 | 0 | 0 | FUNCTION #1 |
| 0 | 0 | 1 | 0 | 0 | 0 | 1 | 0 | 0 | 1 | 0 | 1 | 0 | 0 | 1 | 1 | FUNCTION #2 |
| 0 | 0 | 1 | 0 | 0 | 0 | 1 | 1 | 0 | 1 | 1 | 0 | 0 | 1 | 1 | 0 | FUNCTION #3 |
| 0 | 0 | 1 | 0 | 0 | 1 | 0 | 0 | 0 | 0 | 0 | 0 | 0 | 1 | 0 | 0 | FUNCTION #4 |
| 0 | 0 | 1 | 0 | 0 | 1 | 0 | 1 | 1 | 1 | 1 | 1 | 1 | 1 | 1 | 0 | FUNCTION #5 |

INVENTOR
ROY F. HIGGINBOTHAM

BY Arnold, Roylance, Kruger & Durkee
ATTORNEYS

INVENTOR
ROY F. HIGGINBOTHAM
BY Arnold, Roylance, Kruger & Durkee
ATTORNEYS

INVENTOR
ROY F. HIGGINBOTHAM
BY Arnold, Roylance, Kruger & Durkee
ATTORNEYS

INVENTOR
ROY F. HIGGINBOTHAM

BY Arnold, Roylance, Kruger & Durkee
ATTORNEYS

INVENTOR
ROY F. HIGGINBOTHAM

BY Arnold, Roylance, Kruger & Durkee
ATTORNEYS

United States Patent Office 3,538,504
Patented Nov. 3, 1970

3,538,504

COMPUTER CONTROLLED PERIPHERAL PROCESSING DEVICES FOR A TELEMETRY SYSTEM

Roy F. Higginbotham, Sarasota, Fla., assignor to Weston Instruments, Inc., Newark, N.J., a corporation of Delaware Filed Jan. 15, 1968, Ser. No. 698,000
Claims priority, application Great Britain, Jan. 30, 1967, 4,444/67
Int. Cl. G06f *9/18, 15/16*
U.S. Cl. 340—172.5 8 Claims

ABSTRACT OF THE DISCLOSURE

A telemetry system including a plurality of telemetry signal processing modules, each having means for processing coded data, logic circuits and switches. Each module has switches for manually programming the module to perform a plurality of specific data processing functions. Each module also has means for receiving programs from a conventional digital computer, and a selector for determining the program source. Indicator lights continually display the status of programs stored in each module. The computer can be supplied with conventional software programs for addressing and instructing each module on the functions it is to perform at any point during a telemetry data processing cycle. The system configuration can be established, changed or stopped under complete control of the software program, although manual modifications can also be made at any time. The computer receives all prepared data from the modules being used and then processes the data in a conventional manner.

This invention refers to a computer controlled telemetry system and, more specifically, to a system including a plurality of programmable telemetry signal processing units controlled by a computer and connected to provide decoded digitized data to a computer.

The prior art includes telemetry data processing systems in which a number of signal processing units such as signal conditioners, frame synchronizers, discriminators, decommutators, analog-to-digital converters and the like are connected to receive data encoded in one or more conventional modulation forms. In these systems each of the units have been individually and manually controlled, requiring separate manual adjustments each time an instruction change needs to be made in the functions to be performed by the individual unit. The individual telemetry units were not capable of being instructed and controlled in accordance with a predetermined software program. Furthermore, the individual units were not necessarily generally compatible with each other and each unit therefore had to be specially interconnected with other units to satisfy the particular requirements of a given installation.

With the requirements of present day space, military and other systems in which huge volumes of data must be telemetered and processed in the shortest possible time with the greatest possible reliability, such manually adjusted and programmed systems are no longer suitable.

It is therefore an object of the present invention to provided a system in which the operation of a plurality of standardized telemetry data processing units are completely controlled by a conventional digital computer. A further object is to provide a telemetry system in which individual telemetry units are provided in standard forms so that the system is generalized and flexible in nature and in which the units are compatible with each other so as to act as computer peripheral devices.

Another object is to provide a telemetry system in which the individual components are controlled by a computer using conventional software instructions, and in which each telemetry unit has mean for manually modifying the received computer instructions and visually indicating the status of the instructions at every instant.

Broadly described, the system in accordance with the present invention utilizes a plurality of individual telemetry modules, each of which is capable of receiving telemetry data in code modulated form and is further capable of reducing that data to a single standard format. The outputs of all such modules are selectively connectable to the input channel or channels of a conventional digital computer. Each module is programmable either by manual means or by signals provided from the computer in accordance with a conventional software program delivered to the computer. Each module also has means for visually indicating the status of the instructions, whether manual or automatic, at each instant in time.

In order that the manner in which the foregoing and other objects are attained in accordance with the invention can be understood in detail, a particularly advantageous embodiment thereof will be described with reference to the accompanying drawings which form a part of this specification, and wherein.

Figures 1, 5, 8:
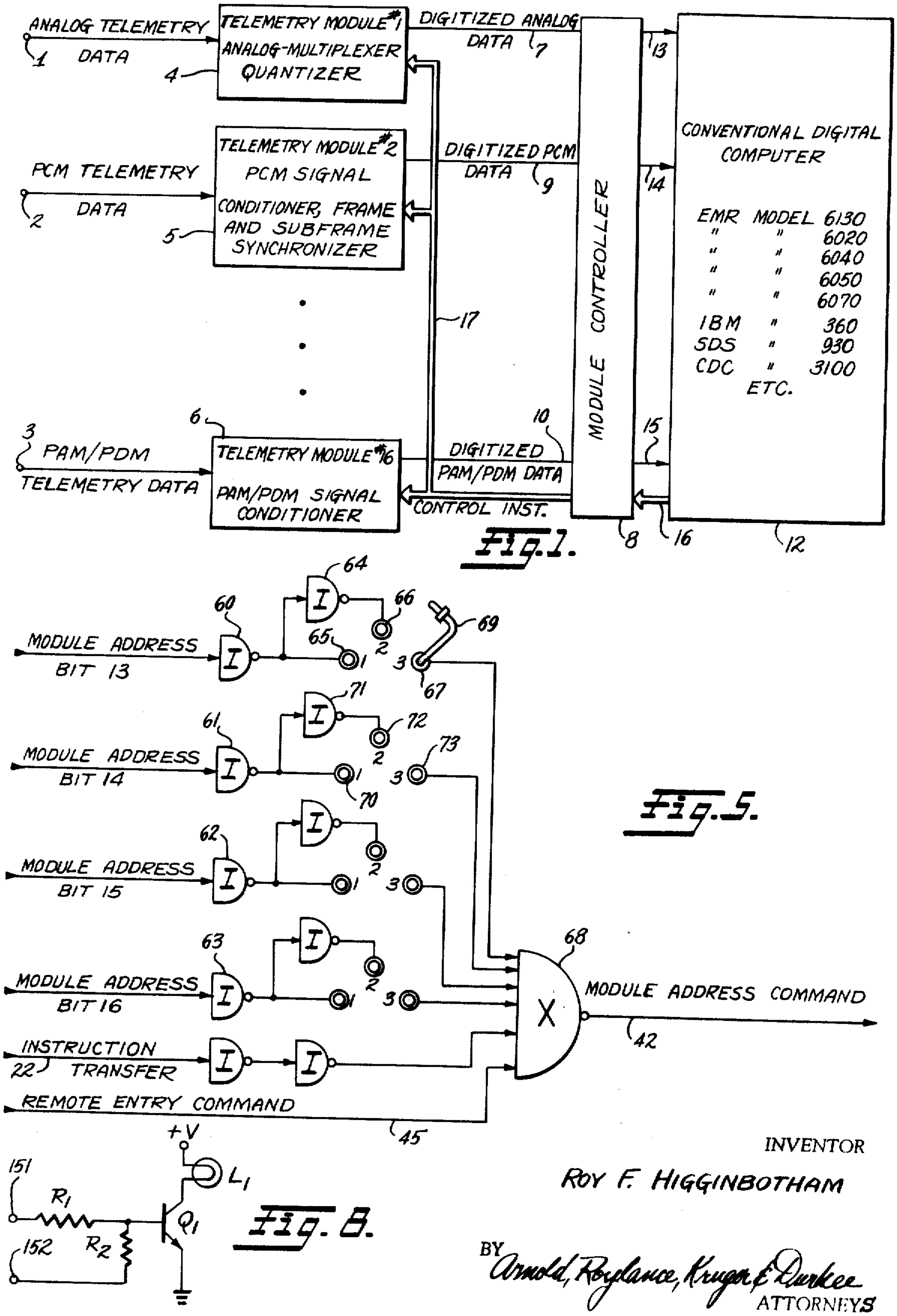
FIG. 1 is a schematic diagram, in block form, showing a telemetry system in accordance with the present invention.
FIG. 5 is a schematic diagram showing the module address decoder logic.
FIG. 8 is a schematic diagram of one embodiment of a lamp driver circuit.

Referring now to FIG. 1, the telemetry data in coded form is received at input terminals 1, 2, and 3, the data being received at terminal 1 being analog data, the data received at terminal 2 being pulse code modulated (PCM) data, and that received on terminal 3 being pulse amplitude modulated and/or pulse duration modulated (PAM/PDM) data. The data provided at terminal 1 is connected to the input of a module 4 which is identified as telemetry module No. 1 of 16 such modules. The data received on terminal 2 is connected to the input of unit 5 which is identified as telemetry module No. 2, and the data received on terminal 3 is connected to unit 6 which is identified as telemetry module No. 16, modules 3–15 not being shown herein. It will be understood, first, that the arrangement of these modules is established for purposes of example only and that any ararngement is suitable. Further, it will be understood that several other such modules can be provided, the modules not shown being adapted to receive any conventionally modulated telemetry data. Unit 4 decodes the analog coded telemetry data and provides that data is a preselected digital format or a conductor 7 which is connected to one input of a module controller unit 8. PCM module 5 similarly decodes the pulse code modulated data and provides that data on a conductor 9 in the same digital format as that provided on conductor 7. In similar fashion, unit 6 decodes the modulated data received on terminal 3 and provides the intelligence contained within that data in digitized form on a conductor 10 to module controller 8, this data also being in the same digital format at that provided by the other modules.

The digitized analog, PCM and PAM/PDM data is provided from module controller 8 to the input channel or channels of a conventional digital computer 12 on conductors 13, 14 and 15 respectively. Computer 12 can be any one of a number of conventional commercially available digital computers such as the models 6130, 6020, 6040, 6050, or 6070 manufactured and sold by the Electro-Mechanical Research, Inc., Sarasota, Fla.; Model 360 produced by International Business Machines Corporation; Model 930 manufactured by the Scientific Data Systems Corporation; or the Model 3100 manufactured by Control Data Corporation. Other models manufactured and sold by other computer producers are also usable, the requirements of such a computer being that a software program can be accepted by the computer and converted into suitable command signals and that the computer is capable of accepting digitized data and providing the conventional records by which the data can be further analyzed and used. The term "software" in this context refers to any conventional computer program in a language such as, for example, Fortran and can be provided on punched tape, magnetic tape, cards, or the like.

It will be recognized that not all of the computers which can be incorporated into this system operate with the same input voltage levels and that some of the computers accept a plurality of the inputs in parallel whereas simpler ones of these computers accept inputs only serially. The function of module controller 8 is to provide the necessary logic to convert a parallel input to a serial output, if necessary, and to adjust the voltage levels to provide the appropriate matching characteristics at the interface. This is a conventional technique whenever peripheral units are used with a computer. The module controller will therefore not be described in further detail. It will be recognized that if the computer is, for example, a parallel input EMR computer and the telemetry modules used are also manufactured by EMR no module controller unit is necessary.

Each telemetry module includes means for manually establishing the functions which are to be performed by that module and the manner in which the data is to be handled by the module. Each module also includes means for receiving instructions from the digital computer as to module address, module function and instruction. This information is provided on multiple conductor cable 16 from computer 12 which is coupled through module controller 8, if used, and then on a cable schematically indicated at 17 to each telemetry module. The composition of the signals on cables 16 and 17 will be described in greater detail below.

The overall operation of the system can now be described with reference to FIG. 1. First, a software program, designed for use with the telemetry information, is entered into the conventional digital computer. This program usually consists of sub-routines, one sub-routine for each telemetry module. Thus, there is a sub-routine to process or handle the analog data, another sub-routine to handle the PCM data, and possibly a third for the PAM/PDM data. Within these sub-routines, the software program is further divided into segments, one segment being set-up data, the other being processing data.

Prior to reception of a signal by the system, the computer transfers certain set-up instructions to the telemetry modules to instruct them on the characteristics of the input signal when it is received. The set-up information is transferred to the telemetry modules prior to processing. This information is limited to instructions for preparing the modules. The processing portion of each one of the sub-routines is used to edit and group together the data. Such processing is performed in any of several general purpose functions that can be accomplished by the digital computer as the data flows from the telemetry modules. This type of software is used whenever the signal is present on the input of these system and is being processed through the system.

To assist in the understanding of the following discussions, it will be helpful to describe the operational advantages of this system. First, it will be observed that all of the processing modes, the control and the configuration of the system depends upon software which is entered into the digital computer and not upon the particular hardware that is contained in the system. The term "configuration" is used herein to mean the selection of which of the telemetry modules are active at a particular time and which are not active. This configuration in the present system need not depend at all upon the circuitry contained in each of the different modules of the system. In the past, conventional telemetry systems have not been controllable by software because they were special purpose in nature and could only accomplish a specific type of mission. The present system can, in an interval ranging between a few microseconds to a millisecond, adopt entirely new configuration.

As an example, the system can be used to process analog data alone for a preselected period of time. Then, in response to appropriate commands from the software program, or in response to a manually inserted change, the system can change over to a configuration capable of simultaneously processing analog, PCM and PAM/PDM data. With this software control capability, the system configuration and the information that it can process can be changed to almost unlimited numbers of processing modes.

It will be recognized that all of the flexibility and all of the reconfigurations can usually be handled by a single operator for the entire system.

Figures 3, 4:
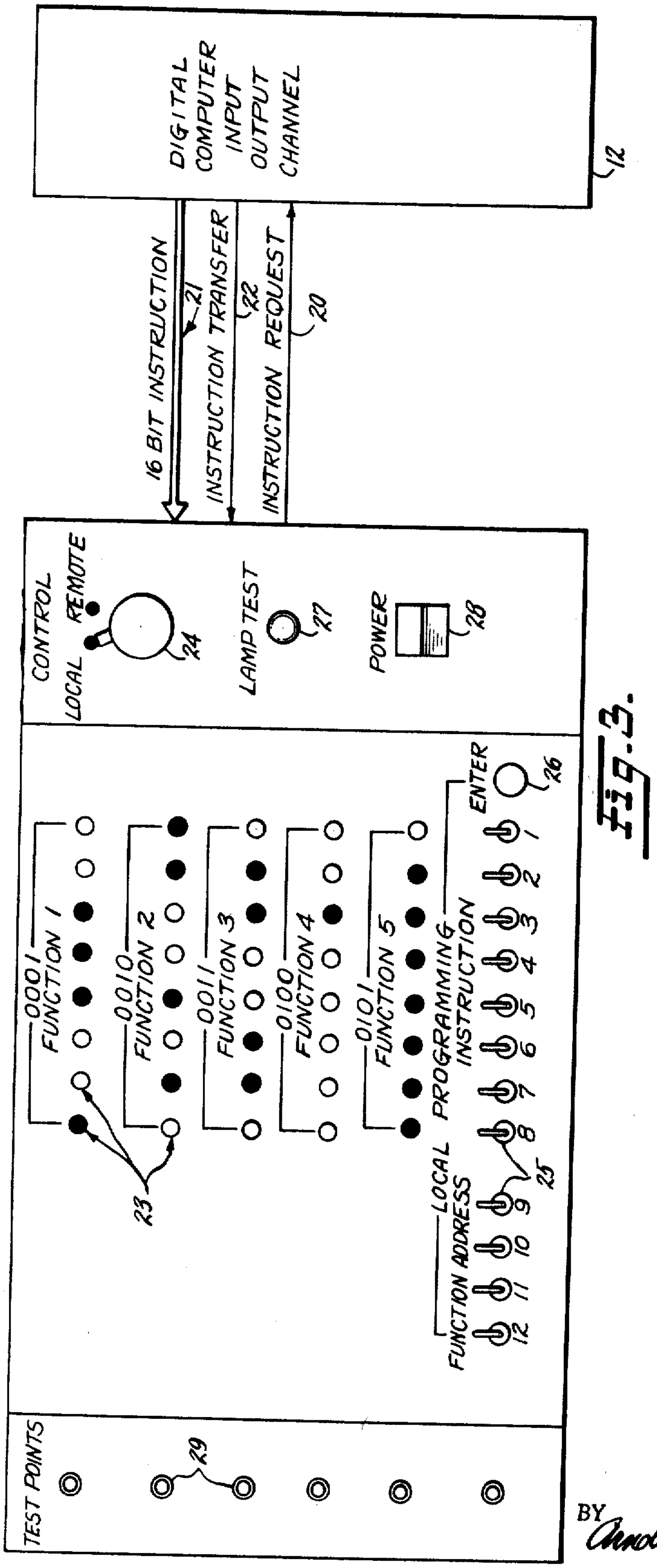
FIG. 3 is a front elevation of a typical telemetry module with local programming inputs and, in schematic form, the remote programming inputs.
FIG. 4 is a table showing a typical instruction program.

In FIG. 3 is shown a block diagram of a conventional computer and the front panel of a telemetry module represented in a typical generalized form, to illustrate the overall concept of how the computer can control and set up the different telemetry modules. First, the telemetry modules provide an "instruction request" to the digital computer on a conductor 20. The computer, in turn, then sends back to each of the telemetry modules a 16-bit instruction on a cable indicated generally at 21, the instruction being accompanied by an instruction transfer siganl on a conductor 22. The instruction is then entered into the telemetry module.

The instructions received from the computer are entered into bistable circuits contained in each of the telemetry modules. The bistable circuit outputs are connected within the telemetry module to appropriate points to control the functions which are to be performed in that particular module. Each bistable circuit has associated with it a front panel indicating lamp to indicate the state of the bistable circuit and, hence, the information stored in the digital computer or the instruction which the digital computer has issued to the telemetry module. The indicator lamps are generally indicated in FIG. 3 by the numeral 23. It will be observed that forty such lamps are provided in the front panel shown in FIG. 3, eight lamps for each of five functions, indicating that an eight bit word is used to establish the operation of five functions within the module. In addition, each function is identified by a function address code including four bits.

The front panel also includes the capability to locally or manually insert the same instructions that are issued by the computer to the module. A local-remote switch can be placed to the "local" position at which time a program can be inserted by setting appropriate ones of a plurality of toggle switches 25, four of which are set to the appropriate function code as shown in FIG. 3 above each set of function indicator lamps. The program instruction is then inserted with the remaining eight switches after which the operator depresses an ENTER switch 26. It will be also observed that the local programming enter, instruction and function address switches are active only when switch 24 is in the local position.

A lamp test switch 27 is also provided on the front panel so that the operator can test the lamps without setting or changing the program stored in the equipment. It will be noted that depressing the lamp test switch button does not destroy or change the information stored in the bistable circuits.

The front panel also includes a power switch 28 and a plurality of test points 29 which make available to the operator critical parameters throughout the telemetry module. Typical functions available at the test points in a PCM frame synchronizer module can include the bit rate, the frame syncs recycle pulse, the words-per-frame recycle, or the bit-per-word recycle.

Typical functions within a telemetry module which are set up and controlled by the computer are included in the generalized function legends of FIG. 3 and can be, for example, bit rate, frame sync pattern, the number of words per frame, and the number of bits per word. For example, in a model 2730 EMR, Inc. PCM frame synchronizer, the "function one" can be the frame sync pattern; "function two" is the words per frame; and "function three," the bits per word. "Function four" may be used for the word sync patern, and "function five" for either odd or even parity.

The chart of FIG. 4 shows typical codes which can be included in a program to a module of the type shown in FIG. 3. Each line of the chart represents one instruction from the digital computer or one instruction entered locally by the toggle switches 25 on the front panel. Each instruction contains sixteen bits, four of which are the module address (bits 13–16) four of which are the function or group address (9–12), the remaining eight being used for the intstruction data. The instruction data is entered in eight bistable circuits contained in the telemetry module. In turn, the bistable circuits drive the eight lamps on the front panel which are associated with the particular function address given in the instruction as well as the functional signal processing circuits. It will be observed in FIG. 4 that the module address is the same for each function because all are addressed to one module, e.g., a PCM module such as unit 5. It will also be apparent that no toggle switches equivalent to the module address code appear on the front panel because the function address and instruction toggle switches relate only to the module on which they are mounted.

Item No. 1 in FIG. 4 is the instruction which is used to control function No. 1 which, in the example given above, is for the frame sync pattern. In the first eight bits of the instruction there is a group of zeros and ones. For each "one" in this line a lamp is turned on in the panel of FIG. 3 indicating that a "one" has been entered into the bistable circuit and that, in turn, the bistable circuit has turned on the lamp. Progressing on through the programming form from right to left it will be apparent that the illuminated lamps, indicated by the shaded ones of circles 23, correspond to "ones" in the chart of FIG. 4.

Figure 2:
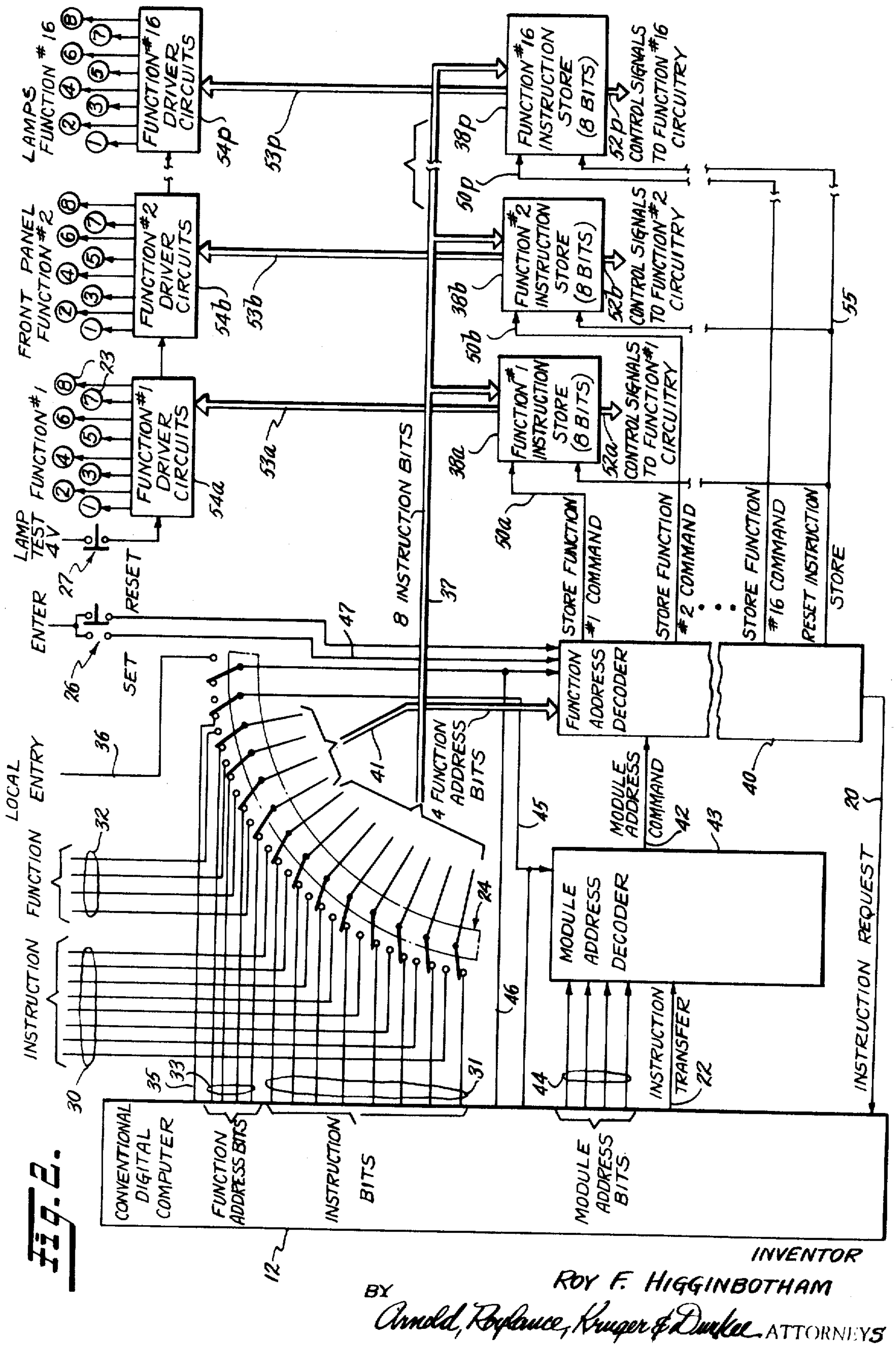
FIG. 2 is a schematic diagram showing the switching and logic for manual and automatic programming of the modules of the system of FIG. 1.

FIG. 2 is a block diagram of the circuitry which is contained in each of the telemetry modules and which receives the instructions either from the digital computer or from the front panel toggle switches, stores those instructions in the proper group of bistable circuits and drives the circuits which turn on or off the front panel indicator lamps. Also, this circuitry provides the control signals to control the functions of the module.

The eight instruction bits, as previously described and as shown in the chart of FIG. 4 are supplied by either computer 12 or the toggle switches. The instruction bits are connected to fixed terminals of local-remote switch 24 through conductors 30, from the toggle switches, and through conductors 31 from the computer. The function address bits are similarly connected to fixed terminals of switch 24 on conductors 32 from the toggle switches and conductors 33 from the computer. Switch 24, as schematically shown in FIG. 2, is a fourteen-pole two position switch and can be a conventional wafer switch or the like. Twelve of the fourteen poles are in electrical contact with those contacts to which conductors 31 and 33 are connected when in the remote position, the same twelve poles being in electrical contact with the contacts to which conductors 30 and 32 are connected when the switch is in the local position. One of the remaining poles is electrically connected, in the remote position, to a conductor 35 which provides a remote entry command signal for connection to a module address decoder to be described hereafter. The remaining pole of switch 24 is connected, in the local position, to a local entry command signal provided on conductor 36 for connection to a function address decoder.

The eight instruction bits, from either source, are connected from switch 24 on a multiconductor cable 37 to a plurality of function instruction stores 38*a–p*, which are labeled in FIG. 2 as function #1, function #2, etc. instruction stores, eight bits each. The instruction bits are simultaneously provided to all instruction stores but are not acted on unless the appropriate stores has received a command to act on the instructions received.

The necessary action command is generated in response to the information contained in the function address bits which are connected to a function address decoder 40 on a multiconductor cable 41 from switch 24. The function address decoder includes logic for analyzing the code in the function address bits and for generating one of sixteen possible commands in response to the existence of one of the sixteen possible combinations of the four bits. The function address decoder also receives a module address command on a conductor 42 if the function address bits are being provided by computer 12. The module address command is provided by a module address decoder 43 which receives the module address bits from computer 12 via conductors 44. Decoder 43 also receives a static signal previously described as the remote entry command on a conductor 45 which is provided through switch 24 from conductor 35 if the data is being received from the computer and if the local-remote switch is in the remote position.

If the program is being entered locally by the toggle switches a module address command is obviously unnecessary. However, the function address decoder still needs an activating signal in order to provide a command signal to the appropriate function store. This signal is provided by ENTER switch 26, which provides a static signal on a conductor 47 when the switch is depressed to its "set" position. The point at which this signal is used will be described with reference to FIG. 6.

Assuming that the four function address bit and either a module address command or a local entry command are present, the function address decoder provides a signal on one of conductors 50*a*–50*p*. Referring to the chart in FIG. 4, it will be seen that the function address includes a "one" in bit 9 and "zeros" in bits 10–12, when the function to be controlled is function #1. A signal is therefore provided on conductor 50*a*, activating function #1 store 38*a* and allowing it to accept the eight instructions bits. The bistable circuits within function #1 store are then set in accordance with the pattern shown in the chart in FIG. 4 with "zeros" in bits one, two, six and seven and "ones" in bits three, four, five and eight. This code is provided to the function #1 circuitry on a control signal multiconductor cable 52*a*. Similar cables 52*b–p* connect function stores #2 through #16 to the associated function circuitry.

In addition, the circuits within the function stores are connected via cables 53*a–p* to their associated lamp driver circuit 54*a–p*. Function #1 lamp driver circuit 54*a* provides voltages to its associated lamps 1–8 which are illuminated by the driver circuits in accordance with the code of voltage levels provided on cable 53*a* which, in turn follows the pattern establishes the eight instruction bits shown in the chart of FIG. 4. Thus, the indication provides continuous information as to the status of each function in the particular module. A lamp test switch indicated generally at 27 is provided to check the lamps for malfunction. The function #2–#16 driver circuits and front panel lamps are similarly interconnected to reflect the status of their associated instruction stores.

Reset commands can be provided on conductors 55 to selectively reset each store prior to updating the program information for that store.

A local entry command on conductor 46 or a remote entry command on conductor 45 provides a signal to computer 12 indicating the position of the local-remote switch. If the detected position is inconsistent with the entry of information and instructions, the computer can be programmed to advise the operator of this condition by printout or other means.

FIG. 5 schematically shows the logic within module address decoder 43. Each of module address bits 13, 14 and 15 and 16 received on conductors 44 from computer 12 is connected to the input of one of buffering and inverting gate circuits 60, 61, 62 and 63. The output terminal of inverter circuit 60 is connected to the input of an inverting gate circuit 64 and to a receptacle 65. The output of inverter 64 is connected to a receptacle 66 which is identical to receptacle 65. A third receptacle 67 is connected to one input of an inverting AND gate 68. The first, second and third receptacles 65, 66 and 67 are not initially interconnected. A jumper or patch cord 69 is provided with plugs to match the receptacles so that receptacles 67 can be connected to either one of receptacles 65 and 66. Thus, the input of gate 68 to which receptacle 67 is connected can be coupled to either of the first and second receptacles to respond to the existence of either a one or a zero at the input to inverting gate 60.

The output of inverting gate 61 is similarly connected to a receptacle 70 and to the input of an inverting gate 71, the output of the inverting gate being connected to a receptacle 72. A receptacle 73, which can be connected by the patch cord to either of receptacles 70 or 72, is connected to a second input to gate 68.

Inverting gates 62 and 63 are connected to similar inverting gates and receptacles to provide two more inputs for AND gate 68. By properly connecting patch cords between the third receptacles in each bit "channel" and one of the other two receptacles, each individual module can be programmed permanently to respond to a specific module address of the type shown in the module address line of FIG. 4. It will be recognized that for the address shown in FIG. 4 the module would be programmed with the third receptacle for bit 14 connected to the second receptacle so that a "one" at the input to gate 61 will be twice inverted and will appear as a "one" at the input of AND circuit 68. The remaining patch cords would be connected between the third and first receptacles so that a zero appearing at each of the inputs to gates 60, 62 and 63 would likewise appear as "ones" at the input to gate 68. As will be recognized by one skilled in the art, all inputs to gate 68 must be present as "ones" before an output is provided.

The remaining two inputs to gate 68 are the instruction transfer input which is provided from computer 12 on line 22 as shown in FIG. 2, and the remote entry command which is provided on conductor 45 from switch 24 when the local-remote switch is in the remote position and a command is about to be provided. The module address command output, when all of the above inputs are present, is provided on conductor 42 to the function address decoder. As previously described, no output will appear on conductor 42 unless an input is to be received from the computer. This is guaranteed by the requirement of a signal on conductor 45 which only appears when the local-remote switch is properly set and the appropriate output is provided by the computer.

Figure 6:
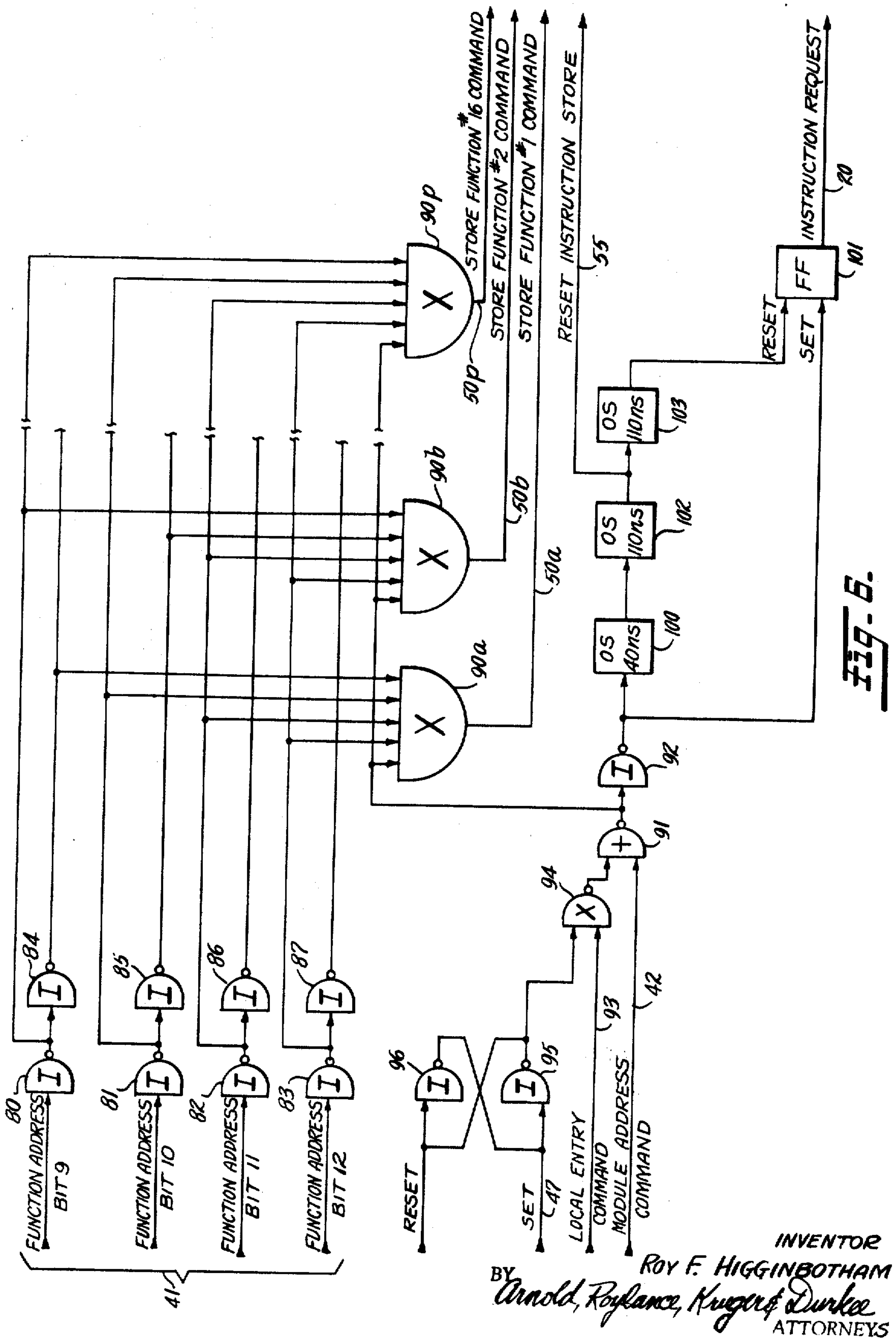
FIG. 6 is a schematic diagram showing the function address decoder logic.

FIG. 6 is a schematic diagram of the logic included in the function address decoder 40. As previously described, the four function address bits, bits 9–12 are provided to the function address decoder on a cable 41. These bits are applied to the input terminals of inverting gates 80, 81, 82 and 83. The inverted outputs from these gates are connected to the input terminals of four more inverting gates 84, 85, 86 and 87. The outputs of gates 80–87 are all available for connection to sixteen AND gate circuits 90*a–p*. The inputs of AND circuits 90*a–p* are selectively connected to the inverter outputs in accordance with the code to which the AND circuits are to respond. The outputs of AND circuits 90*a–p* are the store function commands for the function #1–#16 instruction stores 38*a–p*, respectively. Thus, AND circuit 90*a* must respond to the appropriate code on bits 9–12, representing the function #1 address to provide a store function command to function instruction store 38*a*. No others of the AND circuits 90*a–p* can respond to the same code. Referring again to the chart in FIG. 4, it will be seen that the function #1 function address includes a "one" in bit 9 and "zeros" in bits 10–12. AND circuit 90*a*, as is conventional, requires all "one" inputs before an output can be generated. It is therefore necessary to double-invert bit 9 and singly invert bits 10–12. Thus, the bit 9 input to AND circuit 90*a* is taken from the output of the second inverter, inverter circuit 84. The bits 10–12 inputs to AND circuit 90*a* are taken from the output terminals of inverters 81–83, the necessary input conditions for four of the five inputs of AND circuits 90*a* thus being satisfied when the function address function #1 code is provided on bits 9–12 by cable 41. Similarly, AND circuit 90*b* is connected to respond to the function two function address command 0100 with the bit 10 input connected to the second inversion of the bit 10 signal. The remaining bit nine, eleven and twelve inputs are connected to the once inverted signals.

The remaining AND circuits for store functions 3–15 are similarly connected, each to respond to its specifically assigned code.

The fifth input for each AND circuit is provided either from the module address decoder on module address command conductor 42, or as a result of an ENTER signal provided by closing ENTER switch 26. Assuming that the local-remote switch is in the remote position, a module address command signal is provided on conductor 42 which is connected to one input terminal of an inverting OR circuit 91 which buffers that signal and passes it to the fifth inputs of all of AND circuits 90*a–p*. The output of OR circuit 91 is also connected to the input of inverter circuit 92. If the local-remote switch is in the local position a local entry command signal is provided on conductor 93 to one input terminal of AND circuit 94, placing the AND circuit in condition to respond to any signal applied to its other input terminal. The other signal is provided when switch 26 is closed, sending a SET signal to the SET input terminal of a bistable circuit formed by the interconnection of inverter circuits 95 and 96. An output signal is provided at the output terminal of inverter 95 and therefore to the other input terminal of AND circuit 94. The output of circuit 94 is buffered through OR circuit 91 to the fifth input terminal of AND circuits 90*a–p*. The output of OR circuit 91 is also inverted by inverter circuit 92.

It will be recognized that the signals on conductors 42 and 47 are mutually exclusive, i.e., only one of these signals will be present at any given time because the local-remote switch must be in the local position to provide the signal on conductor 47 and in the remote position allowing a signal to appear on conductor 42.

The output of inverter circuit 92 is applied to the input of a one-shot or monostable multivibrator 100 and to the SET input terminal of a bistable or flip-flop circuit 101. This signal places bistable circuit 101 in a SET state, producing a signal on conductor 20 which is the instruction request conductor connected to computer 12, notifying the computer that an instruction has been received in the process of transferring the instruction into the module for storage.

The output of multivibrator 100 is connected to the input of a second monostable multivibrator 102 the output of which is connected to the input of a third monostable multivibrator 103, the output of which is connected to the reset input terminal of bistable circuit 101. The output of multivibrator 102 is also connected on conductor 55 as the RESET instruction store signal. Multivibrators 100 and 102 have a combined time delay of approximately 150 nanoseconds. Multivibrator 103 has a delay of an additional 110 nanoseconds. Hence, bistable circuit 101 is placed in a SET state for a period of 260 nanoseconds. During this interval a second instruction cannot be received from the computer. The total time between receiving a command to transfer an instruction into the module and the time when the instruction request notifies the computer that the transfer is successful is approximately 150 nanoseconds.

Figure 7:
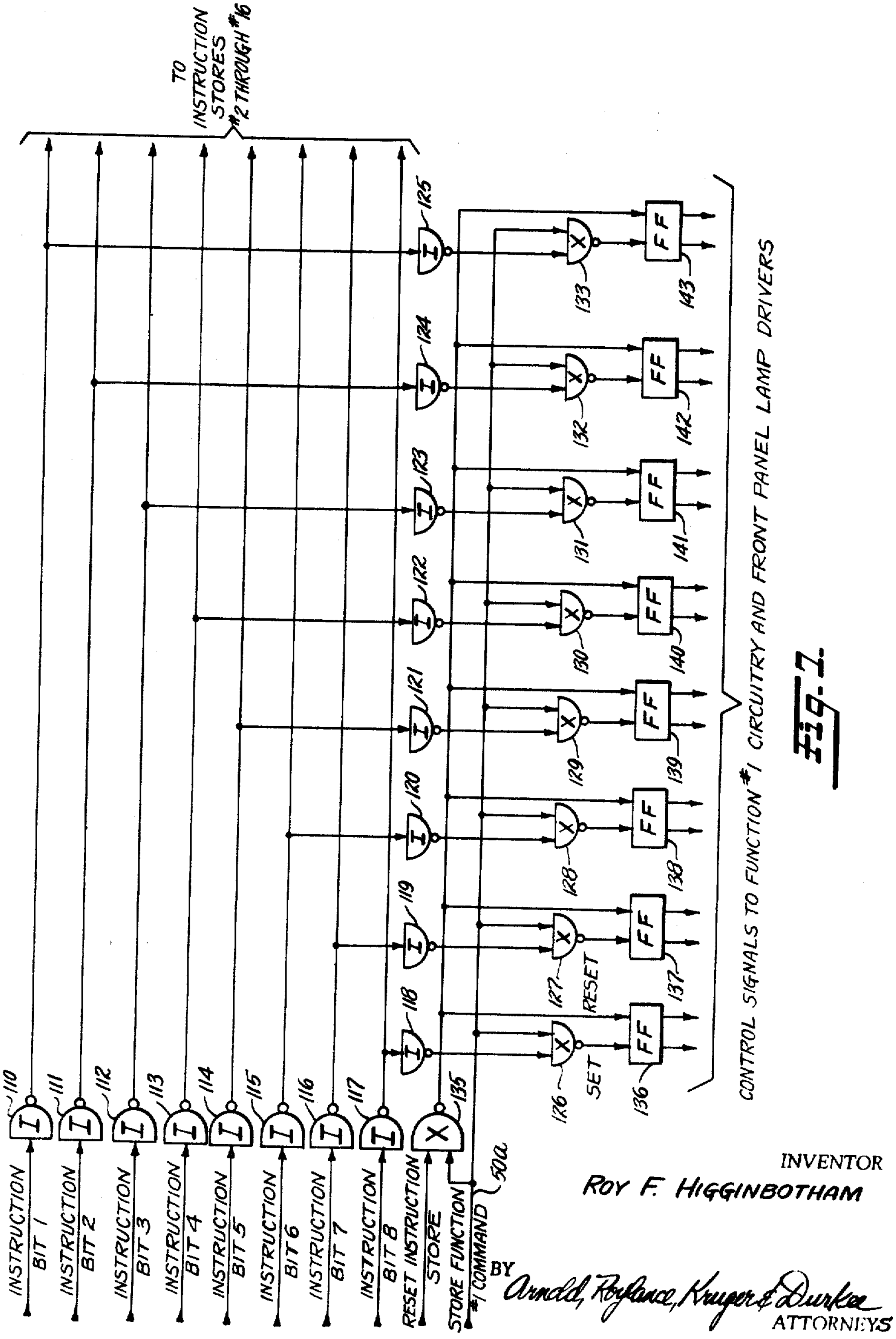
FIG. 7 is a schematic diagram showing the instruction store logic.

FIG. 7 shows the logic circuitry, in schematic form, within the function #1 instruction store identified in FIG. 2 as unit 38*a*, and also shows a group of buffer-inverters common to all instruction stores. It will be recognized that the logic within the function number two and subsequent instruction stores will be identical to that shown in FIG. 7, the only modification being the provision of the appropriately numbered command signals for the other units. Instruction bits 1–8 are connected, by multiconductor cable 37, to the inputs of eight buffer-inverter circuits 110–117 before connection to any of the function instruction stores. Inverters 110–117 are common to all instruction stores. This is a conventional buffer technique and is not separately illustrated in FIG. 2. It will be apparent that the outputs of inverters 110–117 are available in parallel to all sixteen of the function instruction stores. Within instruction store #1 each of the instruction bits is again inverted by eight buffer inverter circuits 118–125. Each output from inverters 118–125 is connected to one input terminal of each of AND circuits 126–133, respectively. A store function #1 command is provided on conductor 50*a* to one input terminal of an inverting AND circuit 135 and to the other input terminals of all of inverting AND circuits 126–133. At the time the store function command signal is provided, each of AND circuits 126–133 which has at its other input terminal a "one" signal produces a SET output signal which is connected to the SET input of an associated one of bistable circuits 136–143. At this point in time, the SET output terminals of bistable circuits 136–143 exhibit a pattern which is identical to the code pattern of instruction bits 1–8 provided at the input terminals of inverters 110–117. Thus, if the function #1 signal includes an instruction such as that shown in FIG. 4, and if the store function #1 command has been received, bistable circuits 136 and 139 through 141 will shift to their SET states while the remaining bistable circuits will remain in their RESET states. The outputs of bistable circuits 136–143 are then used to drive the lamp driver circuits and illuminate appropriate ones of the front panel lamps and are also used to provide inputs to the selected functions within the telemetry module to control or set-up that particular function.

When it is desired to reset all of bistable circuits 136–143 to their zero condition, a store function #1 command is provided to AND circuit 135 concurrently with the RESET instruction store signal at which time circuit 135 provides a RESET signal to each of the bistable circuits.

A typical lamp driver circuit is shown in FIG. 8. One such lamp driver circuit is connected to each bistable circuit in each instruction store so that the contents of the function instruction stores are displayed on the front panel lamps. In the circuit of FIG. 8, input terminal 151 is connected to the SET output terminal of its associated bistable circuit. Input terminal 152 is connected to the lamp test push button 27. Terminals 151 and 152 are connected through resistors R1 and R2 respectively, to the base electrode of a conventional NPN transistor Q1. The emitter electrode of the transistor is connected to ground and the collector electrode is connected through a front panel indicator lamp L1 to a source of positive voltage. In normal operation the lamp test push button is at ground so that the voltage at terminal 152 is zero. When the flip-flop associated with the lamp circuit produces a logical one output, a positive voltage is applied to terminal 151 and transistor Q1 is driven into a condition of saturation conduction. Current therefore flows to the emitter electrode circuit of transistor Q1 and through lamp L1, causing the lamp to light. When the bistable circuit output is zero, the transistor is non-conductive and the lamp is off. Closing the lamp test push button switch connects a positive voltage to terminal 2, rendering transistor Q1 conductive and again illuminating the lamp. With the test push button depressed, the voltage applied to terminal 151 is immaterial, i.e., the lamp will light regardless of the state of the bistable circuit which controls the lamp. Thus, depressing the tset button checks the condition of the lamp without effecting the state of its associated bistable circuit, and without regard to the information stored.

Figure 9:
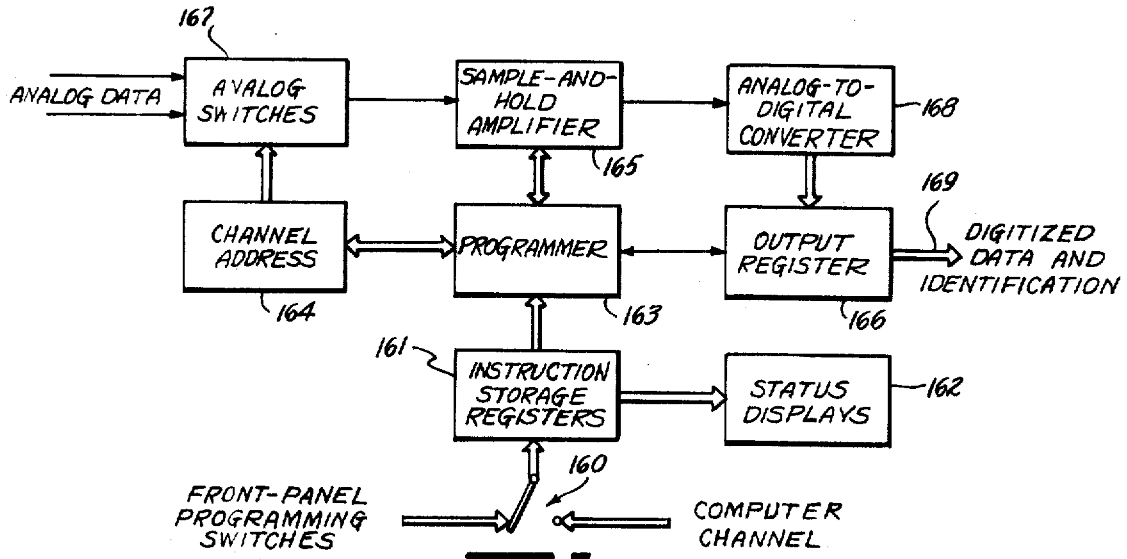
FIG. 9 is a schematic diagram of a typical analog multiplexer-quantizer usable in a telemetry module.

FIG. 9 shows, in block diagram form, an example of an analog multiplexer-quantizer of the type usable for the function circuitry in telemetry module #1, unit 4 in FIG. 1. In FIG. 9 a switch indicated generally at 160 is a multiple pole switch of the same type as switch 24. FIG. 2, which selects programming information from either the front panel switches or from the computer. The instruction and program information is delivered from the switch to an instruction storage register unit 161 which is of the type described with reference to FIGS. 2, 6, and 7. An output of unit 161 controls status displays 162 which can be viewed as including lamp driver circuits of the type shown in FIG. 8 with the associated display lamps. A further output of unit 161 is connected to a programmer 163 which provides a control output of a channel address unit 164; a sample trigger signal to sample and hold amplifier 165; and a trigger for an output register 166. The analog data is delivered to one or more analog switches 167 which are closed, in the electrical sense of closing a circuit, in response to the program function information received by the programmer through the channel address unit. When closed, the analog switches connect the information to the sample and hold amplifier unit which provides the suitable samples to a conventional analog to digital converter 168 which digitizes the information. The output of the converter is stored in the output register 166 until the program indicates that a suitable time has arrived for the information to be provided to the computer. At that time, the digitized data and suitable identification information is connected via cable 169 to the computer input.

Figure 10:
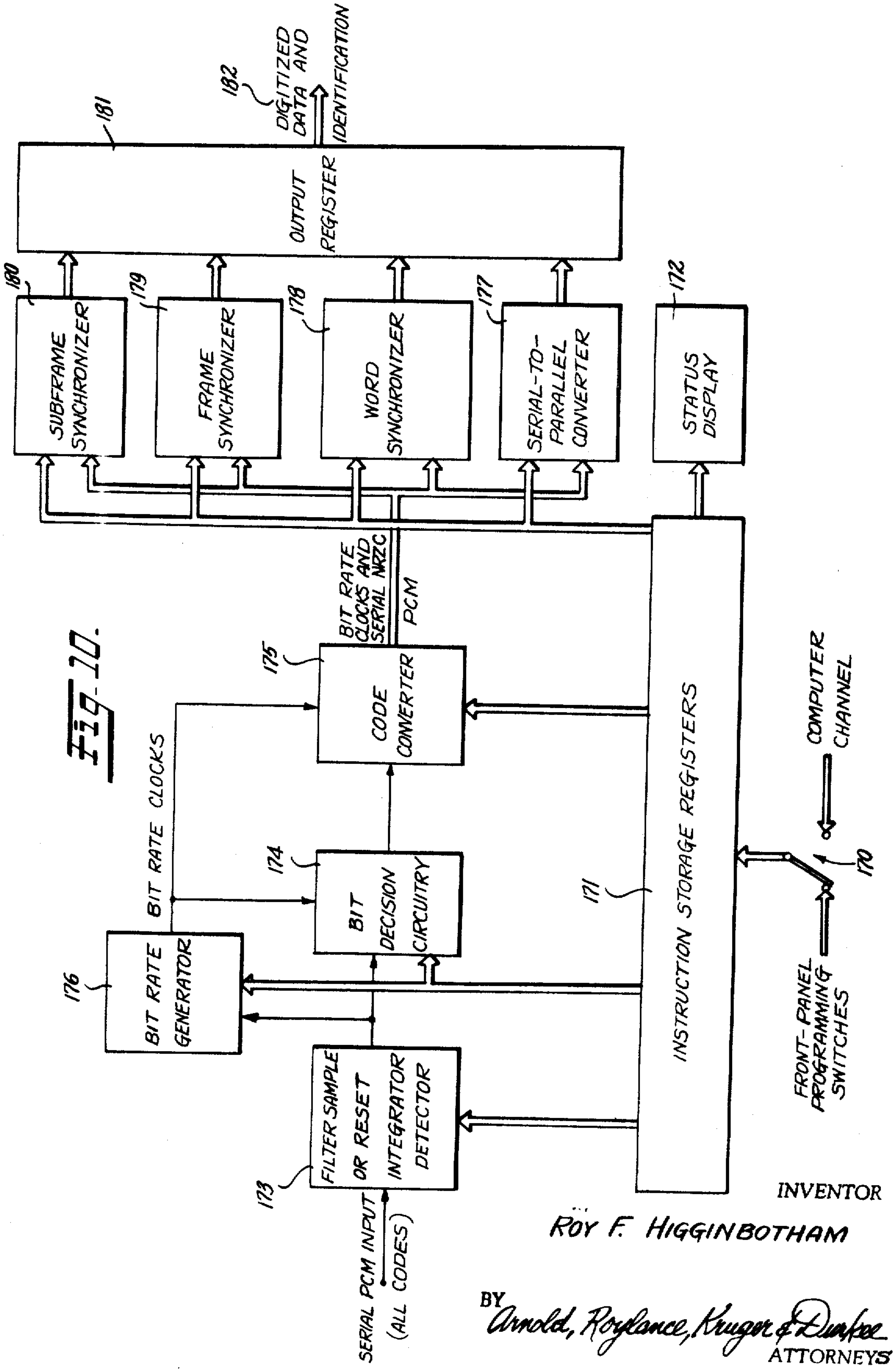
FIG. 10 is a schematic diagram showing a typical PCM telemetry module.

FIG. 10 shows, in block diagram form, a typical programmed processing system for handling PCM information. The system shown is an example of the type which can be incorporated in Unit 5 of FIG. 1. The apparatus of FIG. 10 again includes a multiple-contact switch indicated generally at 170 for determining the source of program information as between front panel switches or the computer. The information is stored in instruction storage registers 171, which control status displays 172. The registers provide program function information for virtually all networks within the telemetry module. The incoming PCM data is applied to the input of a filter sample or reset integrator detector unit 173, which is used to extract the PCM signals from the noise, and which provides the necessary scaling of the input signal. The output of the detector is provided to the input of bit decision circuitry 174 and also to a bit rate generator 176. The bit rate generator establishes bit rate clock pulses in synchronism with the serial PCM data.

After passing through the bit decision circuitry, the PCM signal is reconstructed, then converted to an NRZC (non-return-to-zero) code by the code converter 175. The serial NRZC code and bit rate clock pulses are connected to the inputs of a serial-to-parallel converter 177, a word synchronizer 178, a frame synchronizer 179, and a subframe synchronizer 180. The synchronizers establish clock pulses and identification signals in synchronism with their respective synchronization patterns that are contained in the incoming serial PCM format. The serial-to-parallel converter output, synchronized clock pulses, and synchronized identification signals are stored in an output register 181, from which they are coupled to the computer on a multiconductor cable 182.

Figure 11:
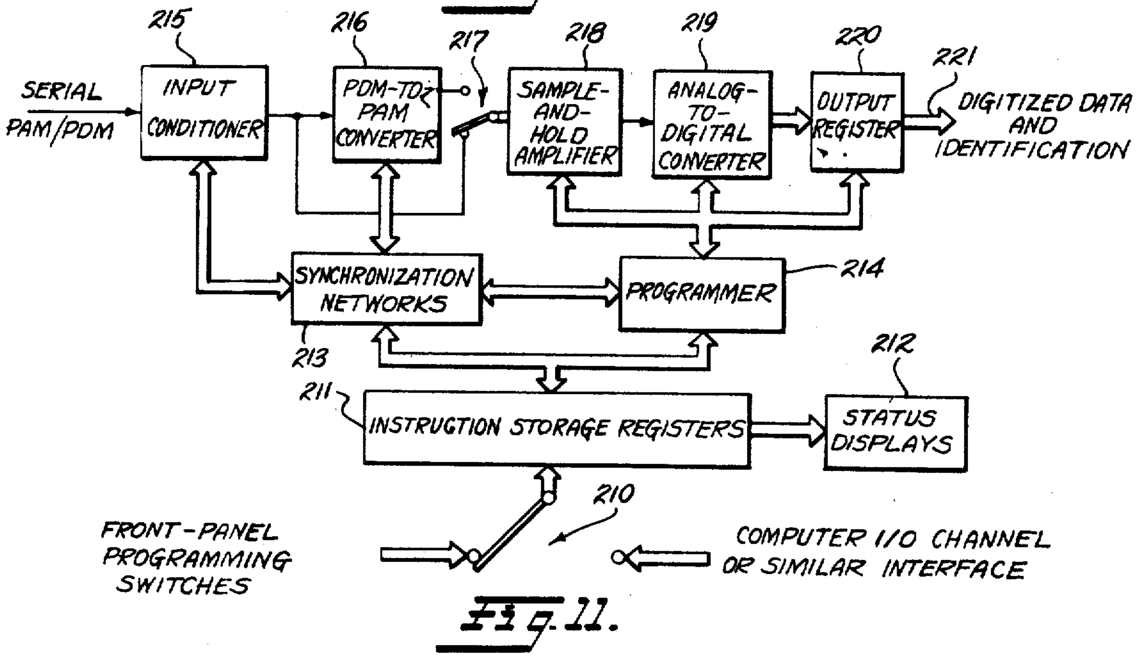
FIG. 11 is a schematic diagram of a typical PAM/PDM telemetry module.

FIG. 11 shows a typical PAM/PDM signal conditioner which can be incorporated in unit 6 of FIG. 1. The apparatus of FIG. 11 again includes a multiple contact switch indicated generally at 1 for determining the source of program information as between front panel switches or the computer. The information is stored in instruction storage registers 211 which control status displays 212. The registers provide program function information for synchronization networks 213 and a programmer unit 214. The PAM/PDM data is applied to an input conditioner unit 215 which provides the necessary buffering noise reduction and scaling of the input signal. The output of the conditioner is provided to the input of a PDM to PAM converter 216 and also through a shunt circuit to one contact of a multiple pole two position switch indicated generally at 217. Switch 217 has a PAM position and a PDM position so that if the information being received is amplitude modulated the switch can be placed in the position shown in FIG. 11, allowing the output of the conditioner to be delivered directly to the input of a sample and hold amplifier 218. If the input information is pulse duration modulated, switch 217 is placed in its other position, the PDM position, so that the data can first be converted to PAM information and then delivered to the sample and hold amplifier.

The output of amplifier 218 is connected to a conventional analog to digital converter 219, the digitized information being coupled from the converter to an output register 220 from which it is coupled to the computer on a multiconductor cable 221. The sample and hold amplifier, converter and output register are controlled by programmer 214 which provides the necessary sample and trigger pulses. The input conditioner and the PDM to PAM converter are controlled by the synchronization networks which are also of conventional design.

It will be recognized that the particular arrangement of the circuits shown in FIGS. 9, 10 and 11 are presented by way of example only and are not included as being an essential element in the specific embodiment shown in the present invention.

While one advantageous embodiment has been chosen to illustrate the invention it will be understood by those skilled in the art that various changes and modifications can be made therein without departing from the scope of the invention as defined in the appended claims.

What is claimed is:

1. A telemetry system comprising the combination of a plurality of telemetry signal processing means for receiving modulated data signals and for converting said data signals into one preselected digitized language; a digital computer for providing programmed instruction signals for each of said signal processing means in accordance with a software program provided to said computer; means interconnecting said processing means and said computer for providing said instruction signals to said processing means and for providing said data signals to said computer at signal levels and in a sequence appropriate for said computer; means included in each of said processing means for recognizing a predetermined address code in said programmed instruction signals and acting on instructions contained therein, each of said processing means having a unique address; means in each of said processing means for storing instructions addressed to it; and means in each of said processing means for controlling data processing functions therein in accordance with said stored instructions.

2. Apparatus according to claim 1 wherein at least one of said plurality of signal processing means includes means for converting analog modulated telemetry data signals into a preselected digital code.

3. Apparatus according to claim 1 wherein at least one of said plurality of signal processing means includes means for converting pulse code modulated telemetry data signals into said preselected digital code.

4. Apparatus according to claim 1 wherein at least one of said plurality of signal processing means includes means for converting pulse amplitude modulated telemetry signals into a preselected digital code.

5. An apparatus for processing telemetry signals comprising the combination of a plurality of telemetry modules, each of said module comprising first circuit means for accepting a modulated telemetry signal and for demodulating said signal and producing therefrom a signal in digital form acceptable to a digital computer, digital storage means for accepting and storing digital instruction signals and for producing function control signals for said first circuit means, and logic circuit means for accepting digital address signals and for responding to a single preselected address code in said address signals to activate said digital storage means; digital computer means for accepting a pre-arranged program and for producing digital address and instruction signals in accordance with the program; second circuit means interconnecting said digital computer means and said plurality of modules for providing said address and instruction signals to said logic circuit means and said storage means; and third circuit means interconnecting said plurality of modules and said computer means for providing signals produced by said first circuit means to said computer means.

6. Apparatus according to claim 5 wherein said logic circuit means includes module address decoding means for responding to a portion of said address signals when said signals are arranged in a code preselected for that individual module and for providing a command signal in response to the existence of said pre-arranged code; and function address decoding means for receiving a further portion of said address signals and for responding to the existence of a pre-arranged code therein concurrently with a command signal from said module address decoding means to provide one of a plurality of possible output command signals to said digital storage means.

7. Apparatus according to claim 6 wherein said digital storage means comprises a plurality of instruction stores, each of said stores including a plurality of gate circuit means and a plurality of bistable circuits; means for connecting said gate circuit means in each instruction store to one of said plurality of outputs from said function address decoder, said gate circuit means being responsive to the presence of a command signal and an instruction to set said bistable circuits in an arrangement representative of said digital instruction signals, the outputs of said bistable circuits being connected to said first circuit means to control the demodulation functions thereof.

8. An apparatus according to claim 7 and further comprising display means for indicating in digital form the information stored in said bistable circuits, said display means comprising a plurality of selectively energizable lamps energizable in accordance with the pattern of said bistable circuit states.

References Cited

UNITED STATES PATENTS

| | | | |
|---|---|---|---|
| 3,303,476 | 2/1967 | Moyer et al. | 340—172.5 |
| Re. 26,171 | 3/1967 | Falkoff | 340—172.5 |

GARETH D. SHAW, Primary Examiner